United States Patent [19]

Klee

[11] Patent Number: 4,519,171

[45] Date of Patent: May 28, 1985

[54] WORK-HOLDING FIXTURE FOR CRYOGENIC DECOATING

[75] Inventor: David J. Klee, Emmaus, Pa.

[73] Assignee: Air Products and Chemicals, Inc., Allentown, Pa.

[21] Appl. No.: 461,087

[22] Filed: Jan. 26, 1983

[51] Int. Cl.³ ............................................. B24C 9/00
[52] U.S. Cl. .................................... 51/419; 51/426; 403/353
[58] Field of Search ............. 51/419, 421, 426, 216 T, 51/277, 322, 319–321; 248/342, 321, 336, 337, 320; 118/500; 134/142, 143; 403/353, 360–361, 381; 269/61; 211/163; 99/421 V

[56] References Cited

U.S. PATENT DOCUMENTS

| | | | |
|---|---|---|---|
| 1,173,178 | 2/1916 | Dawes | 51/419 |
| 1,228,711 | 6/1917 | Steinberger | 403/353 |
| 2,996,864 | 8/1961 | Leliaert | 51/13 |
| 3,110,983 | 11/1963 | Moore | 51/9 |
| 3,158,966 | 12/1964 | Mead | 51/426 |
| 3,703,789 | 11/1972 | Zeidler | 51/9 |
| 3,824,739 | 7/1974 | Moret et al. | 51/9 |
| 4,312,156 | 1/1982 | McWhorter | 51/418 |

FOREIGN PATENT DOCUMENTS

| | | | |
|---|---|---|---|
| 1112048 | 11/1981 | Canada | 51/1 |
| 0279666 | 11/1930 | Italy | 403/353 |
| 0470250 | 3/1952 | Italy | 99/421 V |
| 0795919 | 1/1981 | U.S.S.R. | 51/419 |

Primary Examiner—Frederick R. Schmidt
Assistant Examiner—Robert A. Rose
Attorney, Agent, or Firm—Richard A. Dannells, Jr.; E. Eugene Innis; James C. Simmons

[57] ABSTRACT

A quick-coupling device is provided for suspending a rotatable work-holding fixture from a driving device. The driving device is supported from the free end of a cantilever beam attached to the inner face of a door hinged to the framework of a thermally insulated treating cabinet. The driving device has a downwardly extending power take-off shaft terminated in an enlarged plug portion peripherally bevelled to nest in a mating connector affixed to the work-holding fixture thereby forming a friction drive for said fixture. The connector has a C-shaped slot through which the plug can be passed to support the fixture at the nesting mated surfaces. The arrangement is particularly designed for use in impact blasting of coated articles in batch operation, in which the reduced loading time is a highly important consideration.

9 Claims, 10 Drawing Figures

WORK-HOLDING FIXTURE FOR CRYOGENIC DECOATING

TECHNICAL FIELD

The present invention relates to cryogenic systems for shot blasting of workpieces and is more particularly concerned with work-holding fixtures employed in the thermally-insulated treating chamber of such systems.

BACKGROUND OF THE INVENTION

It is a known technique to remove flash from molded plastic and elastomeric articles and paint or coatings from various articles by contact with a chilling medium, generally at cryogenic temperature, to embrittle the flash or coating, and subjecting the chilled article to impact with a high velocity stream of shot or pellets.

In a typical operation the piece or pieces to be treated are introduced into a thermally insulated chamber maintained at required low temperature and the stream of blasting media is centrifugally impelled at high velocity against the surface of each workpiece by a rotating impeller or so-called throwing wheel. Systems of this general type are described, for example, in U.S. Pat. Nos. 2,996,846; 3,110,983; 3,824,739; 4,312,156; Canadian Pat. No. 1,112,048, and in copending application Ser. No. 445,778 filed Nov. 30, 1982. Systems are also known for blasting of workpieces, such as metal castings to be cleaned or deburred, with an abrasive medium, impelled against the surface of the workpiece by a throwing wheel, as illustrated for example, by U.S. Pat. No. 3,703,789.

In certain of these prior art systems the workpieces are moved through the treating chamber on an endless conveyor during treatment; other systems operate in a batch mode wherein a batch comprising one or a number of pieces to be treated are loaded into the treating chamber, subjected to impact with the blasting medium and then withdrawn to be replaced by a fresh batch. In the batch process, some form of support is provided for the workpieces, which may be stationary or may include means for rotating or otherwise moving the workpieces or the supporting fixture, to expose the several surfaces to the blasting media. Power means may be provided for opening and closing the door of the treating chamber during loading and unloading.

In the batch process for removal from workpieces of paint or coatings embrittled by chilling, a very short-cycle time needs to be employed. Thus, the door to the treating chamber must be opened and closed frequently while the system is at desired operating temperature. The workpieces to be treated may vary considerably in size and shape, so that it is desirable to provide a work-supporting fixture designed to accommodate the different types and sizes of workpieces being subjected to the blasting operation.

Since the coating removal cycle time is very short, generally in the order of only about 6 to 8 minutes, it is necessary for desired productivity to provide a method and means for rapid loading and unloading of the work-supporting fixture. In addition, rapid loading and unloading will minimize warming of the opened outer door, heat leak into the insulated chamber, and condensation of moisture on the cold surface. As each of these items contributes to thermal loss in the system, loading time is an important factor to be considered to provide an efficient system and process that consumes the least amount of cryogenic coolant.

Some of the foregoing requirements can be met by the provision of a conventional hook suspended from the roof of the treating chamber from which hook the work-supporting fixture can be suspended, with means being employed for rotating the hook and the suspended fixture. Such an arrangement, however, presents several disadvantages that would be detrimental to the operation of a cryogenic coating removal operation.

A conventional type of hook will substantially delay the loading and unloading of the work-supporting fixture. Each time that the outer door is opened during successive batch operations, the operator must observe the rotational position of the hook and then jog the work rotation drive until the hook has been aligned for engagement with the support fixture. In the possible event that an article falls off the fixture, the conventional hook will continue to transmit the full torque, jamming the rotation system. In such an event the equipment may be damaged by a jam and in certain circumstances the hook may be disengaged and allow the work-supporting fixture to fall. Also, when the door is opened, there is the additional hazard presented that the fixture could topple and cause personal injury to the operator. Further, a conventional hook suspension will allow the fixture to wobble during rotation and thereby cause articles to fall off the fixture.

The above described hazards and problems are obviated or substantially minimized by the novel features of the present invention hereinbelow described.

SUMMARY OF THE INVENTION

In accordance with the present invention, a rotatable supporting fixture in the form of a rack for workpieces of various types and sizes is suspended in a thermally insulated blasting chamber. The fixture is rotated by a driven output shaft to which the fixture is attached by a novel mated coupling arrangement whereby engagement and disengagement of the fixture from the output shaft can be readily and rapidly accomplished at any relative circumferential positions of the respective mated parts of the coupling. Precise pre-alignment between the mating components is not required. Rotation of the work-supporting fixture by the drive shaft is effected by a friction drive, which enables the coupling device to slip should the system become jammed for any reason. The friction drive between the drive shaft and the suspended fixture is had by means of their respective frusto-conical mating surfaces whereby the assembly is self-centering and permits the fixture to be driven at required speed without wobble or vibration.

Operation and structural features of the system of the invention will be understood and its advantages more fully appreciated from the description which follows read in connection with the accompanying drawings illustrating a preferred embodiment.

BRIEF DESCRIPTION OF THE DRAWINGS

As seen in FIGS. 1 and 2, a tall treating cabinet 10 having thermally insulated walls, roof and floor (insulation not shown) is provided with an insulated outer door 11, hinged to the structural framework 12 of the cabinet. Suitable gaskets and liners are provided to maintain a tight seal at the door frame when the door is in its closed position.

Figure 1:
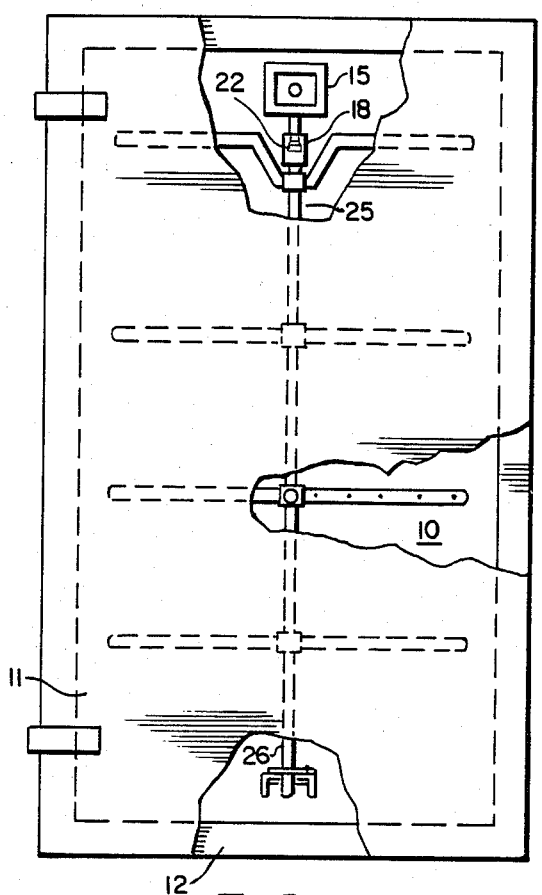
FIG. 1 is a front elevation of the treating cabinet with the door closed; portions of the door being broken away to show the interior of the cabinet.
Figure 2:
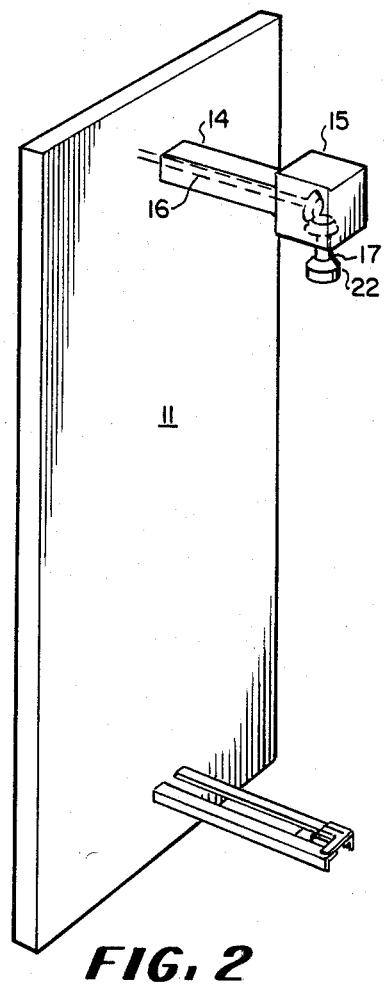
FIG. 2 is a perspective view of the door, showing the attached cantilever beam and the lower rotation guide.

A cantilever beam 14 is attached to the inner face of the door adjacent the top thereof and extends into chamber 10 when the door is closed. At the free end of beam 14 a gear box 15 is fixedly attached. A horizontal shaft 16 is supported for rotation within a hollow bore extending longitudinally through the beam, one end of said shaft being operatively connected to a motor (not shown) directly or through suitable power transmission means, mounted on the outside face of the door. The opposite end of shaft 16 is attached to one part of a bevel gear set mechanical movement (not shown) of the known kind within gear box 15 for converting horizontal rotation to vertical rotation. The companion vertically disposed bevel gear has attached thereto a depending short power take-off shaft 17, which constitutes the means for rotating the work-supporting fixture 25 operating within chamber 10, as will be further explained.

Figure 3:
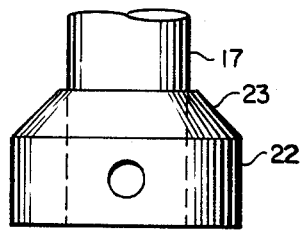
FIG. 3 is an enlarged detail view of male plug component of the coupling.

The diameter of the terminal free end of shaft 17 is enlarged by attachment thereto of a plug 22 which operates as the male member of a mated coupling and drive connection 18. As seen in greater detail in FIG. 3, plug 22 is in the form of a cylindrical collar having an internal diameter such that the plug fits tightly over the periphery of shaft 17, to which it is rigidly attached by suitable means such as a pin or the like. The upper circumferential end of plug 22 is bevelled to provide a downwardly and outwardly diverging frusto-conical taper 23 which serves as the nesting surface for a mated companion member, as will hereinafter appear.

Figure 10:
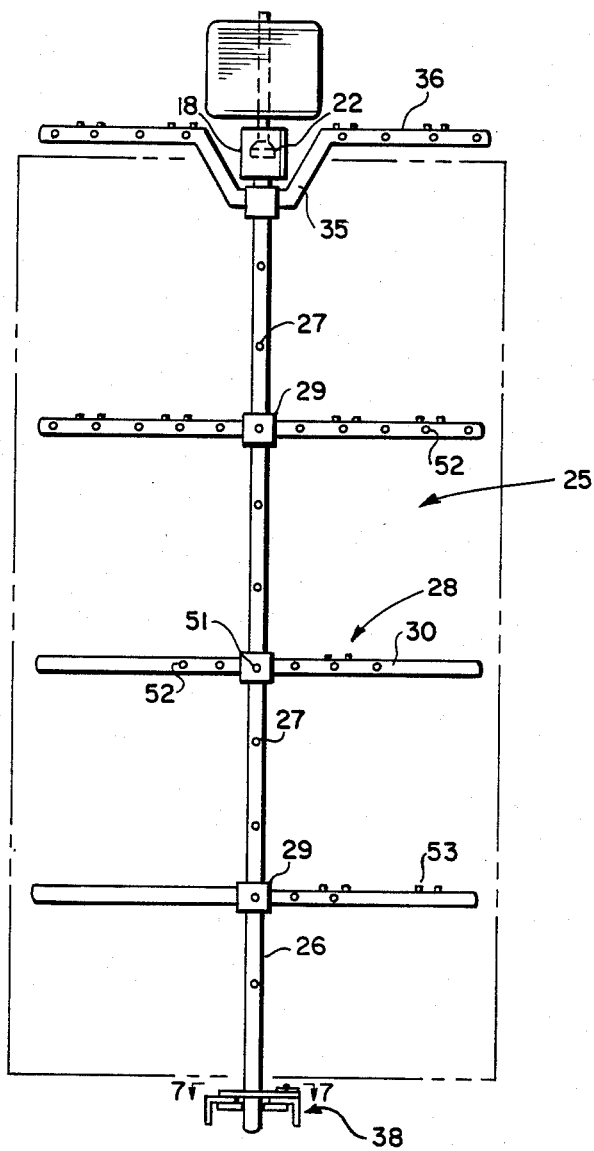
FIG. 10 is an enlarged detail view in elevation of the work support fixture and its connection to the driving mechanism.

As seen in FIG. 1, coupled to and depending from plug 22 is the work-supporting fixture 25, the structure of which is illustrated in greater detail in FIG. 10. Fixture 25 is in the form of a rack on which articles to be decoated of various shapes and sizes can be hung or otherwise supported. Fixture 25 comprises a long shaft 26, which is provided at suitable spaced intervals along the length thereof with transversely extending holes 27. The holes 27 are for the purpose of removably attaching to shaft 26 a series of spider members 28 at selected levels along the length of shaft 26. Such attachment is effected by inserting a pin through a hole in the collar or hub 29 of the spider member and into the selected hole 27 of shaft 26.

Each of the spider members 28, as shown, has four arms 30 welded to and extending radially outward from hub 29, and equally circumferentially spaced from one another. It will be understood that a greater or lesser number of spider arms may be employed, if desired, on one or more of the spider members 28.

To maximize operating height within cabinet 10, the uppermost spider member 35 has its arms 36 elevated in a gull-like wing configuration approximate the connector plug 22.

Figure 7:
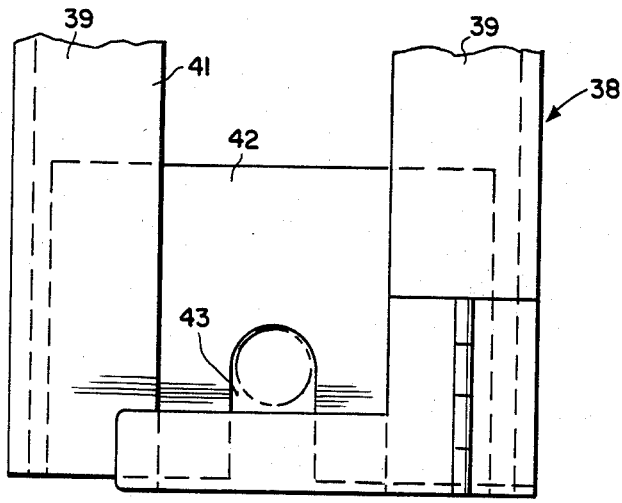
FIG. 7 is an enlarged plan view of the rotary guide member, taken along the line 7—7 of FIG. 10.
Figure 8:
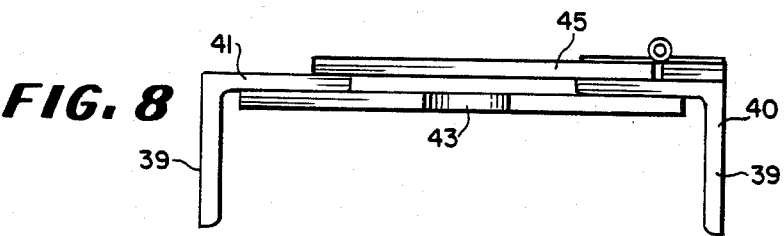
FIG. 8 is an end view of the part shown in FIG. 7.

Approximate the bottom edge of door 11 and in line with the cantilever beam 14 a rotation guide 38 is provided to receive the distal end of shaft 26. As best shown in FIGS. 7 and 8, rotation guide 38 comprises opposed angle bars 39 attached to the inner face of the door and extending outwardly therefrom for a distance somewhat beyond the peripheral area of suspended shaft 26. Angle bars 39 have downwardly directed vertical legs 40 and horizontal arms 41, which arms are directed inwardly toward the axis of shaft 26. A flat plate 42 is welded to the underside of both of the arms 41. Plate 42 is provided with a slot 43 parallel to bars 39 and extending inwardly from one edge of plate 42 for a distance such that the lower end of suspended shaft 26 fits within the slot. Attached to the upper surface of one of the angle bars 40 is a hinged bar 45, the free end of which bar extends in closed position for a distance such as to cover a portion of the upper surface of the opposed horizontal arm 41. Thus, when the hinged bar 45 is flipped to closed position, shaft 26 is retained in correct alignment.

Figure 4:
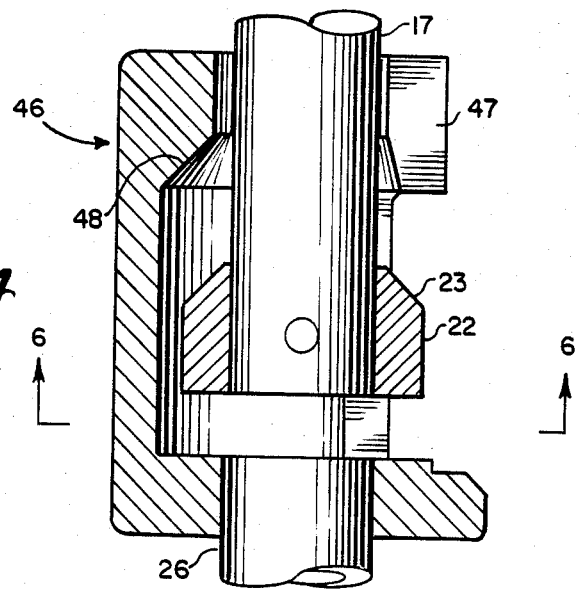
FIG. 4 is an enlarged sectional view of the coupling components with the mating parts in disengaged position.

The novel manner of coupling fixture 25 by its shaft 26 to plug 22 will now be described. As seen particularly in FIGS. 4, 5 and 6, the upper terminal end of shaft 26 is provided with C-shaped connector 46 welded or otherwise fixedly attached thereto. Member 46 is in the form of a short hollow tube, having an inner diameter substantially exceeding the outer diameters of shafts 17 and 26 respectively. A slot is formed in one side of C-shaped connector 46 having a space length between the upper and lower arms of the C substantially greater than the length of male plug 22. The inner face of the upper arm 47 of member 46 is bevelled to form an outwardly divergent frusto-conical rim 48 for mating with the bevelled edge face 23 of plug 22. As seen in FIG. 4, shaft 26 and attached connector 46 are in raised position, connector 46 having been slipped over plug 23 through the side slot in connector 46. When member 46 is permitted to fall into operating position, a nested contact is established between the mating surfaces 23 and 48. The weight of the fixture 25 exerts a downward force on mating surface 23, effecting sufficient friction at the surfaces of contact (23, 48) to establish a reliable friction drive for rotation of connector 46 and its attached shaft 26, when shaft 17 is being rotated. Should a condition develop that fixture 25 is held up by jamming or otherwise, the frictional drive connection between plug 22 and connector 46 will permit slippage and avoid damage to the work supporting fixture or its associated parts and mechanisms.

Figure 5:
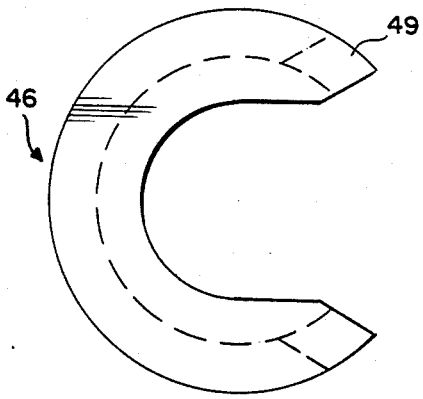
FIG. 5 is a partial top plan view of the female connector component of the coupling shown in FIG. 4.
Figure 6:
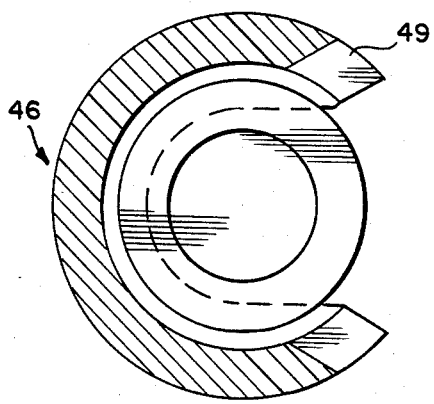
FIG. 6 is a partial bottom plan view taken along the line 6—6 of the female connector component of the coupling shown in FIG. 4.

As seen in FIGS. 5 and 6 the edges of the slot of connector 46 are bevelled at 49 at an angle of about 30° to accommodate horizontal misalignment when engaging plug 22 into connector 46.

Figure 9:
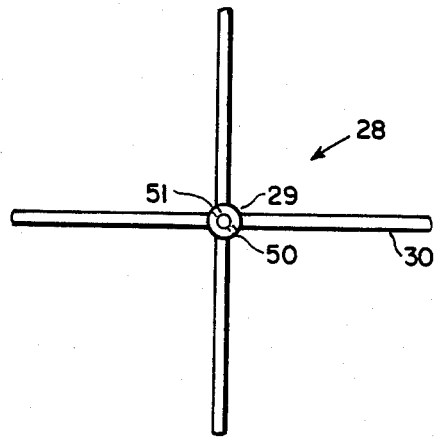
FIG. 9 is a bottom plan view of one of the spider members shown in FIG. 10, portions being omitted for clarity.

Details of the work supporting fixture 25 are illustrated in FIGS. 9 and 10. Each of the hubs 29 of a spider member 28 has a hole 50 drilled transversely through the hub at both sides thereof which hole can be aligned with a corresponding hole 27 in long shaft 26. By inserting pin 51 through holes 50 and 27 each of the spider members can be rapidly fixed or adjusted to a desired level on shaft 26.

Each of the spider arms 30 and 36 is in the form of a flat rectangular bar welded to the central hub of the spider member, with the face of the rectangle parallel to the axis of shaft 26. These bars have spaced holes 52 drilled therethrough for attaching articles to the fixture. On the top surfaces of each of the spider arms 30, square pegs 53 are provided for positioning articles looped around the arms. The upper gull-wing spider member 35 is similarly provided with holes and pegs for mounting workpieces thereon. By the arrangement described various sizes and shapes of coated articles can be placed on the work-holding fixture for treatment, ranging in complexity from small hooks to massive weldments. The configuration of the uppermost spider member 35 enables full use of the working space within the chamber, represented by the dotted outline in FIG. 10.

The particular angle of the nested surfaces (23, 48) of the quick coupling 18 is selected such as to maintain a friction drive enabling slippage between plug 22 and connector member 46 should the system become jammed for any reason. The specific angle of the nested surfaces is established by the amount of driving torque required and is defined by the relationship:

$$T = \frac{\mu W d}{2 \cos \phi}$$

Where
T = Driving torque is newton-meter (foot-pounds)
$\mu$ = coefficient of friction
W = weight of the fixture assembly and coated articles thereon in newtons (pounds-force)
d = average diameter of the driving surface in meter (feet)
$\phi$ = angle of the conical mating surfaces in degrees.
While in the illustrated embodiment, the angle is shown at about 45° for manufacturing convenience, the angle may be varied for different applications. Thus, for a given load and fixture assembly the driving torque is inversely proportional to the angle of the mating surfaces of the coupling. The increase in driving torque for various angles is listed below:

| Angle $\phi$ = | 20° | 30° | 45° | 60° |
|---|---|---|---|---|
| Driving torque increase = | 1.06X | 1.15X | 1.41X | 2.0X |

The conical mating surfaces of the assembly are self-centering and thus the system can be driven at the required speed without wobble or vibration. Moreover, the friction drive coupling must be capable of operating at the cryogenic temperatures employed and also withstand the bombardment by the high velocity of the impact media. Further, the assembly must not be adversely affected by the accumulation of media particles or coating residue encountered during repetitive cycles in commercial service. This problem is solved by the sufficiently steep angle of the mating surfaces. At an angle of about 45°, for example, contamination will not accumulate at the mating surfaces.

In operation of the described system, the outer door of the chamber 10 is opened and the fixture 25 already filled with coated articles to be treated is attached to plug 22 depending from cantilever beam 14. Such attachment is effected by raising the fixture to a level somewhat above the level of the plug and moving the fixture laterally through the C shaped slot toward the axis of the output shaft 16, then lowering the fixture to permit coupling at the mated frusto-conical surfaces 23 and 48. The lower free end of shaft 26 will fall or be placed into slot 43 of the rotation guide at the bottom of the door and retained in vertical alignment by flipping the hinged bar 45. The operator now closes the outer door to the treating chamber to initiate the decoating operation.

Coolant, such as liquid nitrogen is injected into the treating chamber to maintain the temperature therein at about −200° F. (−129° C.). At a proper moment in the established automatic cycle, rotation of shaft 26 and fixture 25 is initiated and pellets of blasting media are hurled at the workpieces on the fixture at high velocity by a throwing wheel, whereby the coatings on the workpieces are dislodged. The blasting period is prefixed with respect to the nature and thickness of the coating to be removed. In a typical operation, the completion of the blasting period will be indicated by a light or other signal, at which time the cleaned articles are ready to be removed from the treating chamber. The operator then opens the outer door, unloads the fixture with the clean articles thereon and engages a new fixture with coated articles onto the shaft 17, and again closes the door to begin a new operating cycle.

Since the insulated door to the chamber is quite heavy, suitable mechanical means should be provided for opening and closing the door, under control of the operator. Once the door has been closed, the cycle of operations within the chamber may be set for automatic operation by a relay system not shown.

To minimize changes in temperature within the cabinet during the period that the outer door is open for loading and unloading, an inner door may be provided to close off the doorway space left open by the outer door.

In a typical operation the decoating of articles can be accomplished in a period of about 5 to 10 minutes, operating at a temperature in the range of about −73° to −129° C. (−100° to −200° F.). More generally, the treating time may be as short as 3 and rarely as long as 18 minutes at cryogenic operating temperature. The preferred coolant is liquid nitrogen. The preferred blasting medium is pelleted polycarbonate resin of about 0.254 cm. (0.10 in.) diameter and having a length of 0.254 cm. (0.10 in.).

While the invention finds its most beneficial use in connection with decoating by blasting of embrittled materials by impact media, certain of its disclosed advantages are also obtained in deflashing of molded plastic and elastomeric products.

For most efficient operation timewise, a work-supporting fixture is externally loaded with articles to be treated in advance, so that it will be ready to replace the fixture holding finished already treated articles when the door is opened. In this way the time that the door needs to remain open is significantly shortened; the disengagement of the fixture bearing the treated articles and replacing the same by a loaded fixture bearing articles to be treated, can be accomplished in a matter of seconds.

What is claimed:

1. An apparatus for blasting of workpieces with impact media within a thermally insulated chamber having an outwardly opening access door,
   a cantilever beam affixed adjacent the upper edge of said door and arranged to extend into the interior of said chamber when the door is in a closed position,
   drive means affixed to the free end of said beam having a downwardly extending rotatable power take-off shaft,
   a work-supporting fixture suspended from said power take-off shaft by a quick coupling device, wherein said device comprises bevelled mating surfaces providing a friction drive between said power take-off shaft and said work-supporting fixture whereby the assembly of mating surfaces is self-centering and wherein said quick-coupling device also comprises a first coupling component affixed to said power take-off shaft and a mating C-shaped connector component, attached to said work-supporting fixture, in the form of a short hollow tube having an inner diameter substantially exceeding the outer diameter of said power take-off shaft, said connector component providing a slot at a side thereof affording lateral access for passage therethrough of said first coupling component for engagement and seating of said mating surfaces and an upper laterally extending arm and a lower laterally extending arm vertically spaced from one another at a distance substantially greater than the length of said first coupling component, the inner peripheral surface of said upper arm being bevelled to form a downwardly divergent frusto-conical rim for mating engagement with the first coupling component in nested position, the distance between the upper and lower arms being amply sufficient to afford an easy quick passage for insertion of said first coupling component therebetween when said connector component is in raised position above the lower arm of said connector component, and the opposed outer edges of the laterally extending arms of said connector component are bevelled to accommodate possible horizontal misalignment, whereby rotation of said power take-off shaft is transmitted to effect rotation of said fixture and the weight of the fixture exerts a downward force on the corresponding mating surface effecting sufficient friction at the surfaces of contact to establish a reliable friction drive for rotation of said C-shaped connector component.

2. Apparatus as defined in claim 1 wherein said work-supporting fixture comprises a long shaft extending from said connector component to approximately the bottom edge of said door, at least one pair of spider arms extending laterally from said long shaft, a slotted rotation guide being arranged at the lower end of said door to receive and guide the lower end of said long shaft during rotation.

3. Apparatus as defined in claim 1 wherein said drive means affixed to the free end of said beam comprises a first bevel gear arranged for rotation on a horizontal axis, a companion intermeshing bevel gear arranged to be driven by said first bevel gear for rotation on a vertical axis, a horizontal drive shaft passing through a bore in said beam to which shaft said first gear is affixed, means on the outer face of said door for rotating said horizontal drive shaft, said downwardly extending power takeoff shaft being affixed to said companion bevel gear.

4. Apparatus as defined in claim 1 wherein said drive means affixed to the free end of said beam comprises a first bevel gear arranged for rotation on a horizontal axis, a companion intermeshing bevel gear arranged to be driven by said first bevel gear for rotation on a vertical axis, a horizontal drive shaft passing through a bore in said beam to which shaft said first gear is affixed, means on the outer face of said door for rotating said horizontal drive shaft, said downwardly extending power take-off shaft being affixed to said companion bevel gear.

5. An apparatus for blasting of work pieces with impact media within a thermally insulated chamber having an outwardly opening access door,
   a cantilever beam affixed adjacent the upper edge of said door and arranged to extend into the interior of said chamber when the door is in a closed position,
   drive means affixed to the free end of said beam having a downwardly extending rotatable power take-off shaft,
   a work-supporting fixture suspended from said power take-off shaft by a quick coupling device, said device comprising bevelled mating surfaces providing a friction drive between said power take-off shaft and said work-supporting fixture, wherein said work-supporting fixture comprises a long shaft extending from said coupling device to approximately the bottom edge of said door, a plurality of vertically-spaced spider arms extending laterally from said long shaft, a lower rotation guide being arranged to extend from the inner face of said door adjacent the lower end thereof to receive and guide the free terminal end of said long shaft during rotation of said fixture, wherein said lower rotation guide comprises attaching means for affixing said guide to the inner face of said door extending inwardly into said chamber when the door is in closed position, a plate affixed to said attaching means at only one side of said plate, a slot in said plate in substantial vertical alignment with said quick coupling device for receiving the lower end of said long shaft, and a hinged bar having a movable arm arranged to overlie said slot in closed position,
   whereby rotation of said power take-off shaft is transmitted to effect rotation of said fixture.

6. Apparatus as defined in claim 5 wherein said spider arms are provided with spaced holes extending transversely therethrough for hanging of workpieces thereon.

7. Apparatus as defined in claim 5 wherein said spider arms are provided with spaced pegs on the upper surface thereof for positioning workpieces thereon.

8. Apparatus as defined in claim 5 wherein the arms of the uppermost spider member extend outwardly and upwardly at an acute angle to said long shaft in gullwing configuration.

9. An apparatus for blasting of workpieces with impact media within a thermally insulated chamber having an outwardly opening access door,
   a cantilever beam affixed adjacent the upper edge of said door and arranged to extend into the interior of said chamber when the door is in a closed position, drive means affixed to the free end of said beam having a downwardly extending rotatable power take-off shaft, a work-supporting fixture suspended from said power take-off shaft by a quick coupling device, said device comprising bevelled mating surfaces providing a friction drive between said power take-off shaft and said working-supporting fixture, wherein said work-supporting fixture comprises a long shaft extending from said coupling device to approximately the bottom edge of said door, a lower rotation guide being arranged to extend from the inner face of said door adjacent the lower end thereof to receive and guide the free terminal end of said long shaft during rotation of said fixture, wherein said lower rotation guide comprises attaching means for affixing said guide to the inner face of said door extending inwardly into said chamber when the door is in closed position, a plate affixed to said attaching means at only one side of said plate, a slot in said plate in substantial vertical alignment with said quick coupling device for receiving the lower end of said long shaft, and a hinged bar having a movable arm arranged to overlie said slot in closed position, whereby rotation of said power take-off shaft is transmitted to effect rotation of said fixture.

* * * * *